(12) United States Patent
Brütsch et al.

(10) Patent No.: US 7,967,622 B2
(45) Date of Patent: Jun. 28, 2011

(54) BUS BAR

(75) Inventors: Friedbert Brütsch, Tuttlingen (DE); Ralph Bock, Schonach (DE)

(73) Assignee: Friedbert Brütsch, Tuttlingen (DE)

( * ) Notice: Subject to any disclaimer, the term of this patent is extended or adjusted under 35 U.S.C. 154(b) by 0 days.

(21) Appl. No.: 12/617,350

(22) Filed: Nov. 12, 2009

(65) Prior Publication Data
US 2011/0086531 A1 Apr. 14, 2011

(30) Foreign Application Priority Data

Oct. 9, 2009 (DE) ............ 20 2009 013 791 U
Nov. 3, 2009 (DE) ............ 20 2009 014 846 U (51) Int. Cl.
*H01R 4/60* (2006.01)
(52) U.S. Cl. ............................................. 439/212
(58) Field of Classification Search .......... 439/212, 439/76.2, 77, 949; 174/71 B, 88 B, 77 R; 361/776, 823, 833
See application file for complete search history.

(56) References Cited

U.S. PATENT DOCUMENTS

| | | | |
|---|---|---|---|
| 6,712,623 B2* | 3/2004 | Sumida | 439/76.2 |
| 6,878,017 B2* | 4/2005 | Sakurai et al. | 439/723 |
| 6,884,090 B2* | 4/2005 | Kubota | 439/76.2 |
| 6,887,084 B2* | 5/2005 | Saito et al. | 439/76.2 |
| 6,905,346 B2* | 6/2005 | Momota et al. | 439/76.2 |
| 7,001,187 B2* | 2/2006 | Terunuma et al. | 439/76.2 |
| 7,037,128 B2* | 5/2006 | Yaworski et al. | 439/276 |
| 7,074,093 B2* | 7/2006 | Saka et al. | 439/724 |

FOREIGN PATENT DOCUMENTS

DE 202006016750 U1 12/2006
DE 202008002352 U1 6/2008

* cited by examiner

*Primary Examiner* — Jean F Duverne

(74) *Attorney, Agent, or Firm* — Lackenbach Siegel, LLP; Andrew F. Young, Esq.

(57) ABSTRACT

The invention is a bus bar comprising a cover part made of an insulating material, and a bottom part comprising two chambers each for the reception of one pole connector. A chamber partition wall is arranged between each set of chambers, wherein at least one connecting lug is arranged on a corresponding pole connector. The cover part can be set on the bottom part in such a way that each of the pole connectors is covered, and each of the connecting lugs extends out through corresponding openings in the cover part. At least one partition wall is arranged on the cover part, which is positioned between two adjacent connecting lugs when the cover part is set on the bottom part. The bottom part is closable on its front side by a set of one or more end caps.

13 Claims, 7 Drawing Sheets

BUS BAR

CROSS REFERENCE TO RELATED APPLICATIONS

This application is related to, and claims priority from, German Patent Application Serial No. 20 2009 013 791.0, filed Oct. 9, 2009, and German Patent Application Serial No. 20 2009 014 846.7, filed Nov. 3, 2009, the entire contents of each of which are incorporated herein by reference.

BACKGROUND OF THE INVENTION

1. Field of the Invention

The present invention relates to a bus bar for supplying power to a switch device in an electrical installation distributor.

More specifically, the present invention relates to a bus bar having improved insulation characteristics and a design permitting relatively inexpensive production.

2. Description of the Related Art

The related art involves bus bars for supplying power, simultaneously and phase-wise, to several switch devices arranged next to each other in an electrical installation distributor. Such bus bars have particularly a bottom part and a cover part made of an insulating material, where the bottom part has at least two chambers, which are open to one side facing upwards, each for receiving a pole connector, where, in each case between two chambers, a chamber separation wall is arranged, where connecting lugs are connected to the pole connectors, and where the cover part can be set on the bottom part in such a way that the pole connectors are covered, and the connecting lugs extend out, through the openings in the cover part. Such bus bars are shown, for example, in German Patent DE 20 2008 002 352 U1, as well as in German Patent DE 20 2006 016 750 U1.

The pole connectors lie in the chambers and are insulated from each other by the chamber partition walls, where, however, the connecting lugs extend out, through the chamber partition walls.

In such bus bars with at least two pole connectors, one must ensure that the air gap between the electrically conducting part is sufficient to prevent flashover. Moreover, the air distance between the electrically conducting parts and the external surface of the housing must also be sufficiently large to rule out the risk of a person coming in contact with the conducting parts. Such bus bars must optionally also meet the requirements of the United States standard UL 508, which requires an air distance of at least one inch and a creep distance of at least two inches in such components. Here, air distance is defined as the shortest distance in the air between two conducting parts. The creep distance is defined as the shortest distance along the surface of an insulating material between two conducting parts.

What is not appreciated by the prior art is the drop off in insulation effectiveness afforded by current bus bar designs.

Accordingly, there is a need for improved insulation of a bus bar for efficient supplying of power, simultaneously and phase-wise, to several switch devices when arranged next to each other in an electrical installation.

ASPECTS AND SUMMARY OF THE INVENTION

An aspect of the present invention is to provide for improved insulation of a bus bar for efficient supplying of power, simultaneously and phase-wise, to several switch devices when arranged next to each other in an electrical installation The present invention relates to a bus bar comprising a cover part made of an insulating material, and a bottom part comprising two chambers each for the reception of one pole connector. A chamber partition wall is arranged between each set of chambers, wherein at least one connecting lug is arranged on a corresponding pole connector. The cover part can be set on the bottom part in such a way that each of the pole connectors is covered, and each of the connecting lugs extends out through corresponding openings in the cover part. At least one partition wall is arranged on the cover part, which is positioned between two adjacent connecting lugs when the cover part is set on the bottom part. The bottom part is closable on its front side by a set of one or more end caps.

According to an embodiment of the present invention there is provided a bus bar, with a bottom part and a cover part made of an insulating material, where the bottom part has at least two chambers each for receiving a pole connector, where, in each case between two chambers, a chamber partition wall is arranged, where connecting lugs are arranged on the pole connectors, and where the cover part can be set on the bottom part in such a way that the pole connectors are covered, and the connecting lugs extend out, through openings in the cover part, is characterized in that, on the cover parts, at least one partition wall is arranged, which is positioned between two adjacent connecting lugs, when the cover part is set on the bottom part. In this way, two adjacent connecting lugs are mutually insulated in the intermediate area between the pole connectors, where the collection lugs are arranged with an end area, and the end areas of the connecting lugs which extend out of the cover part, and are connected particularly to switch devices. In particular, the creep distances between the current carrying elements are increased by the arrangement of the partition wall.

According to a particularly preferred embodiment of the invention, the partition wall has a length such that a lower edge of the partition wall, which is turned away from the cover part, is at a separation from an edge of the pole connector that faces the cover part, when the cover part is set on the bottom part. As a result, the mutual insulation of the adjacent connecting lugs is achieved without increasing the creep distance.

In general, the chamber partition walls protrude over the pole connectors in the direction toward the cover part, thus already increasing the creep distances between the pole connectors in this way. To allow the partition wall to reach nevertheless up to the edge of the pole connector that faces the cover part, a slot is preferably provided in the partition wall, starting from a lower edge, in which the chamber partition wall engages when the cover part is set on the bottom part.

Because known bus bars may present not only two, but also three or four pole connectors, the partition wall preferably has a number of slots that corresponds to the number of chamber partition walls.

It is preferred for the cover part to rest on the bottom part, in order to guarantee a reliable fixation of the cover part to the bottom part.

According to an advantageous variant of the invention, the partition wall engages on the chamber partition wall, when the cover part is set on the bottom part, to ensure a reliable fixation. It is particularly preferred for the chamber partition wall to present a locking protuberance, which engages in a corresponding recess in the slot of the partition wall, when the cover part is set on the bottom part, to ensure in this way a space saving arrangement of the locking connection.

A particularly advantageous fixation is obtained if, according to an advantageous embodiment of the invention, the chamber partition wall has on each of its facing side surfaces a locking protuberance, which protuberances then engage in corresponding recesses in the slot of the partition wall, when the cover part is set on the bottom part.

To ensure good insulation and particularly to increase the creep distances between all the connecting lugs, the cover part preferably has a number of partition walls such that in each case one partition wall is arranged between every two connecting lugs.

According to an advantageous variant of the invention, the cover part has two cover sections, to be able to vary the length of the bus bar in a simple way, for example, when the bottom part can be adjusted to any length together with the pole connectors arranged in it.

To allow the prescribed creep distances in such a design as well, the cover sections are preferably designed so they overlap in sections along the longitudinal direction.

A particularly cost effective manufacturing procedure is achieved if the bottom part is designed as an extrusion profile or an injection molded element.

It is preferred for the bottom part to be closable on the front side by two connection caps, particularly to ensure the insulation of the pole connectors even on the front sides, particularly in the case of a bottom part that has been manufactured by the extrusion method.

The above, and other aspects, features and advantages of the present invention will become apparent from the following description read in conjunction with the accompanying drawings, in which like reference numerals designate the same elements.

DETAILED DESCRIPTION OF THE PREFERRED EMBODIMENTS

Reference will now be made in detail to several embodiments of the invention that are illustrated in the accompanying drawings. Wherever possible, same or similar reference numerals are used in the drawings and the description to refer to the same or like parts or steps. The drawings are in simplified form and are not to precise scale. For purposes of convenience and clarity only, directional terms, such as top, bottom, up, down, over, above, and below may be used with respect to the drawings. These and similar directional terms should not be construed to limit the scope of the invention in any manner. The words "connect," "couple," and similar terms with their inflectional morphemes do not necessarily denote direct and immediate connections, but also include connections through mediate elements or devices.

Figures 1, 2, 3:
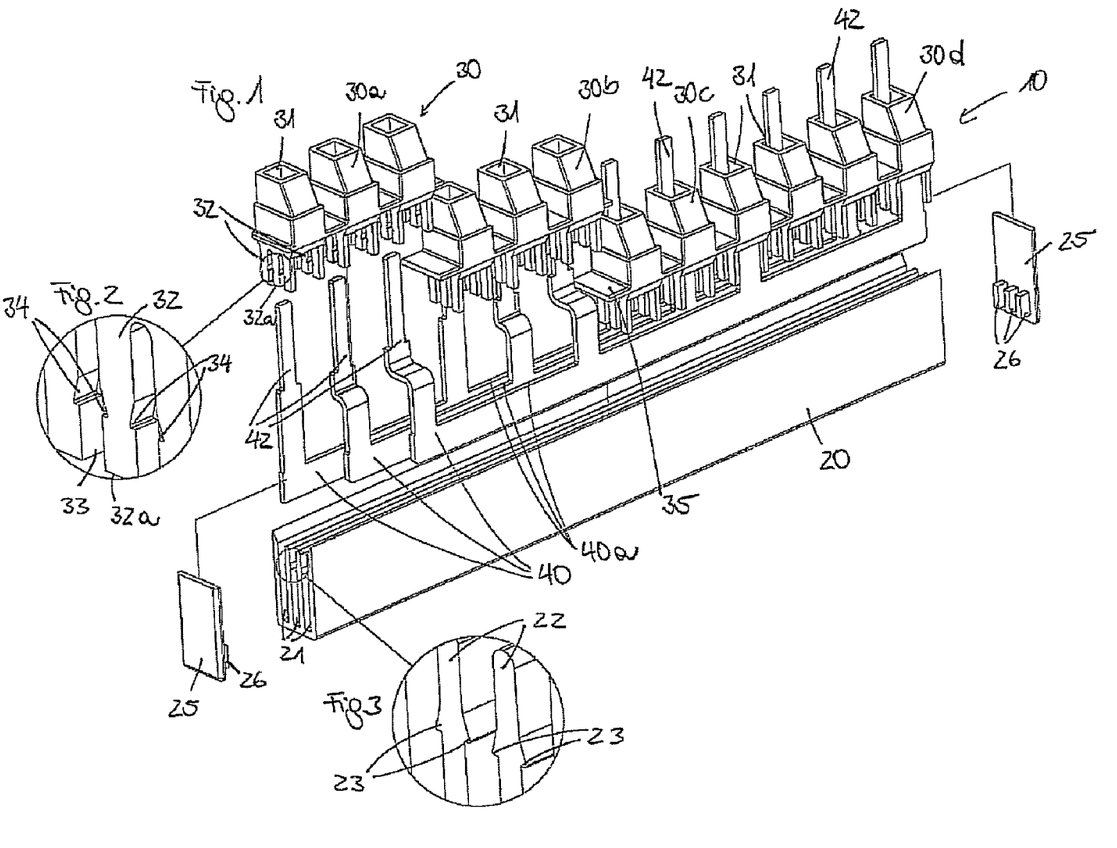
FIG. 1 shows an exploded view of an exemplary embodiment of a bus bar.
FIG. 2 is a detail enlargement of from FIG. 1.
FIG. 3 shows an additional detail enlargement from FIG. 1.
Figure 4:
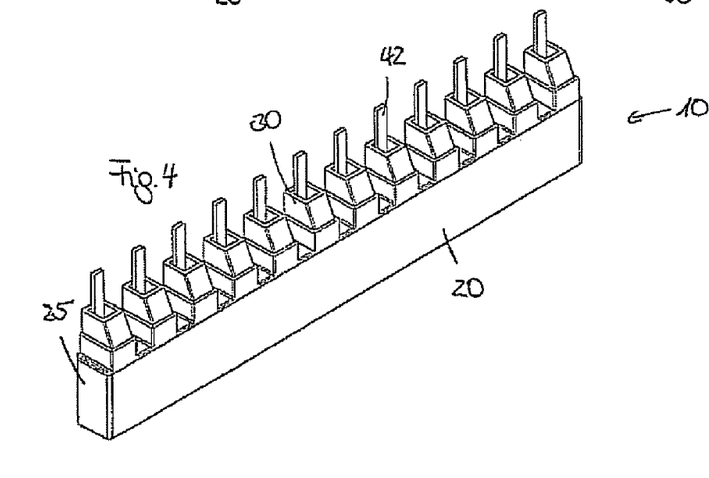
FIG. 4 is a perspective view of the bus bar according to FIG. 1 in the assembled state.
Figure 5:
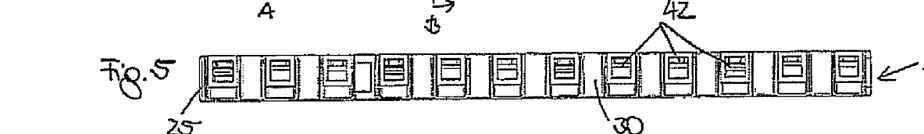
FIG. 5 is a top view of the bus bar according to FIG. 4.
Figure 6:
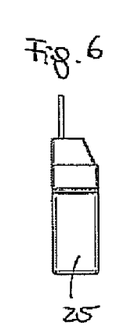
FIG. 6 shows a side view of the bus bar according to FIG. 4.
Figure 7:
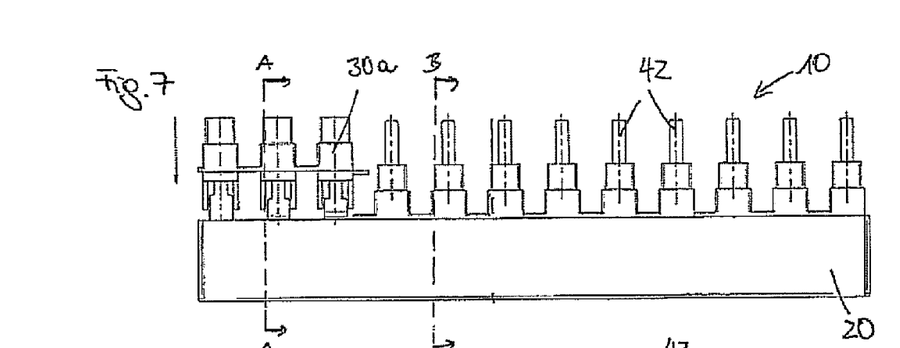
FIG. 7 shows the bus bar according to FIG. 4 with the cover section taken off.
Figure 8:
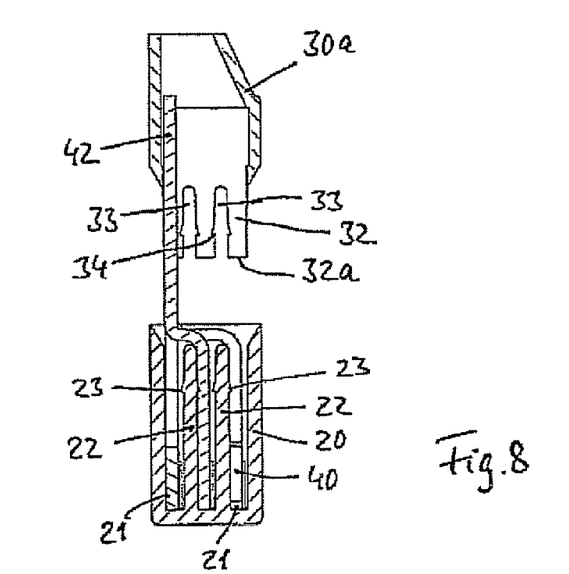
FIG. 8 shows a cross section along the line A-A in FIG. 7.
Figure 9:
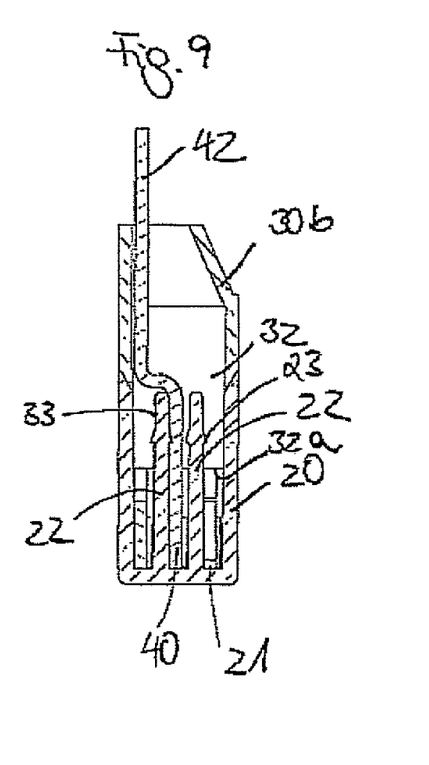
FIG. 9 shows a cross section along the line B-B in FIG. 7.

FIGS. 1-9 show different views of a bus bar 10, where identical reference numerals always denote identical parts, although a more clear view is provided by not indicating all the reference numerals in all of the figures.

The bus bar 10 has a bottom part 20 as well as a cover part 30. The bottom part 20 and the cover part 30 are manufactured from an insulation material.

The bottom part 20 has three chambers 21 which are separated from each other in each case by a chamber partition wall 22. In particular, the chambers 21 are open to one side which is facing upwards. In particular, the bottom part 20 here has two chamber partition walls 22.

The bottom part 20 can be manufactured as a plastic injection molded part or preferably as an extrusion profile. In the embodiment example shown in FIGS. 1-9, the bottom part 20 is manufactured as an extrusion profile. In particular, in the case of manufacturing by the extrusion method, the bottom part 20 can be adjusted to any length, and it is closed on its front sides in each case with an end cap 25. Here, on the internal side of the end cap 25, protuberances 26 are arranged, which engage in a form-fitting manner in the front sides of the chambers 21, on the one hand, to keep the end caps 25 clamped in this way on the bottom part 20, and, on the other hand, to increase the air and creep distances additionally.

In each case, a pole connector 40 is inserted in the chambers 21, so that the bus bar 10 here has three pole connectors 40. The chamber partition walls 22 here extend over the upper edge 40a of the pole connectors 40, to increase, in this way, the air and creep distances between the pole connectors 40 already accordingly. In each one of the pole connectors 40, several connecting lugs 42, separated in the longitudinal direction, are arranged, which protrude substantially perpendicularly away from the pole connector 40, and extend over the chamber partition walls 22, out of the bottom part 20. The connecting lugs 42 are arranged here starting from one of the edges 40a of the pole connectors 40 that faces the cover part 30. Above the chamber separations 22, the connecting lugs 42, here particularly those of two of the pole connectors 40, are offset in such a way that all the free ends of the connecting lugs 42 of the three pole connectors 40 are in one plane and mutually aligned. The connecting lugs 42 of the pole connectors 40 are here separated by a distance such that each third connecting lug 42 is arranged on the same pole connector 40.

To be able to provide upward cover for the pole connectors 40, a cover part 30 is set on the bottom part 20. The cover part 30 has several openings 31, through which the free ends of the connecting lugs 42 extend out of the cover part 40, so that, via the free ends of the connecting lugs 42, the connection can be made, for example, to installation automata.

To secure the cover part 30 on the bottom part 20, a clamping or engagement mechanism can be provided.

The length of the bottom part 20 can be adjusted as desired in the longitudinal direction, which is made possible particularly by manufacturing the bottom part 20 by the extrusion method. To be also able to obtain any desired length of the cover parts 30 in a simple way, the cover part 30 has preferably at least two cover sections, in the present example, four cover sections 30*a*, 30*b*, 30*c* and 30*d*, which are adjacent to each other and completely cover the bottom part 20 in its longitudinal direction. To be able to ensure the required air and creep distances, the cover sections 30*a*, 30*b*, 30*c*, 30*d* are designed so they overlap at least in some sections, for which purpose, for example, a surface 35 is arranged on a front side of the cover sections, which surface grips under the facing front side of the adjacent cover section.

To further increase the air and creep distances inside the housing of the bus bar 10, particularly between the connecting lugs 42, several partition walls 32 are arranged on the cover part 30, which engage in the intermediate area between every two connecting lugs 42. Here, the partition walls 32 are arranged substantially perpendicularly on the cover part 30. These partition walls 32 here run substantially transversely to the chamber partition walls 22.

The partition walls 33 present in each case a lower edge 32*a* that faces away from the cover part 30. The partition walls 32 can have a length such that the lower edge 32*a* is applied on the edge 40*a* of the pole connectors 40, either directly or with a small clearance, when the cover part 30 is set on the bottom part 20; however, they may also present a length such that the lower edge 32*a* comes to be applied with some separation above the edge 40*a* of the pole connector 40. Because the chamber partition walls 22 in general protrude beyond the pole connectors 40, the partition walls 32 present a number of slots 33, in which the chamber partition walls 22 engage when the cover part 30 is set on the bottom part 20, which corresponds to the number of the chamber partition walls 22. Here, the partition walls 32 present in each case two slots 33.

On both side walls of the chamber partition walls 22, a locking protuberance 23 is arranged in each case, which is designed to be continuous, particularly in the longitudinal direction. This is particularly advantageous when the bottom part 20 is manufactured by the extrusion method. The slots 33 of the partition walls 32 present corresponding recesses 34, in which the locking protuberances 23 of the chamber partition walls 22 engage when the cover part 30 is set on the bottom part 20, so that the separation walls 32 engage on the chamber partition walls 22. This engagement can represent the engagement between the bottom part 20 and the cover part 30, or it can be provided additionally to a connecting mechanism between the bottom part 20 and the cover part 30. The air and creep distances between the connecting lugs 42 are increased considerably by the partition walls 32.

Figures 10, 11:
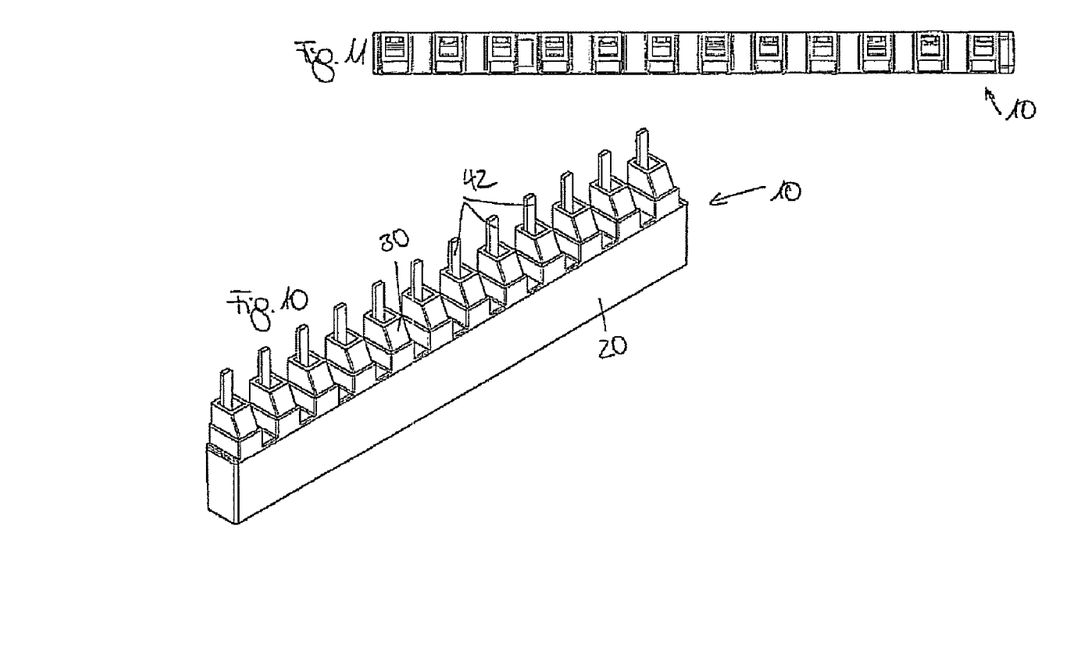
FIG. 10 shows a perspective view of a second exemplary additional embodiment of a bus bar in the assembled state.
FIG. 11 shows a top view of the bus bar according to FIG. 10.
Figure 12:
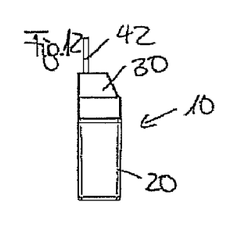
FIG. 12 shows a side view of the bus bar according to FIG. 10.
Figure 13:
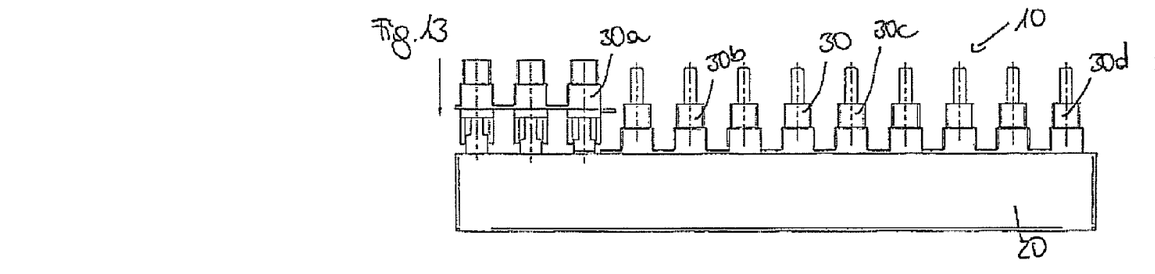
FIG. 13 shows the bus bar according to FIG. 10 with the cover section taken off.

In FIGS. 10-13, a second embodiment is represented, where identical or functionally identical parts with respect to the first embodiment examples are marked with identical reference numerals, and not all the reference numerals are represented in all the figures, to simplify the view.

The second embodiment example differs from the first embodiment example only in that the bottom part 20 is not manufactured by the extrusion method, but as a plastic injection molded part. The bottom part 20 is thus designed as a single piece, and the end caps 25 are omitted.

Figure 14:
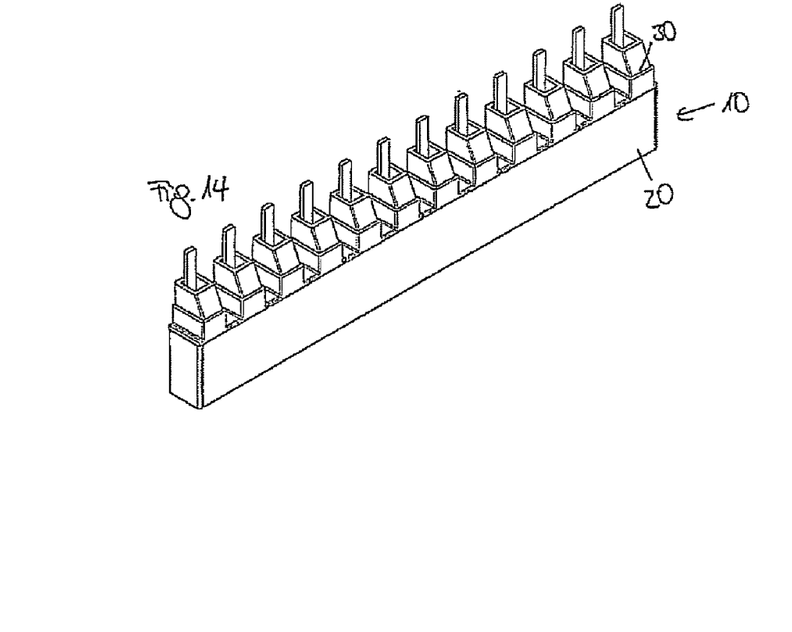
FIG. 14 shows a perspective view of a third exemplary additional embodiment of a bus bar in the assembled state.
Figures 15, 16, 17:
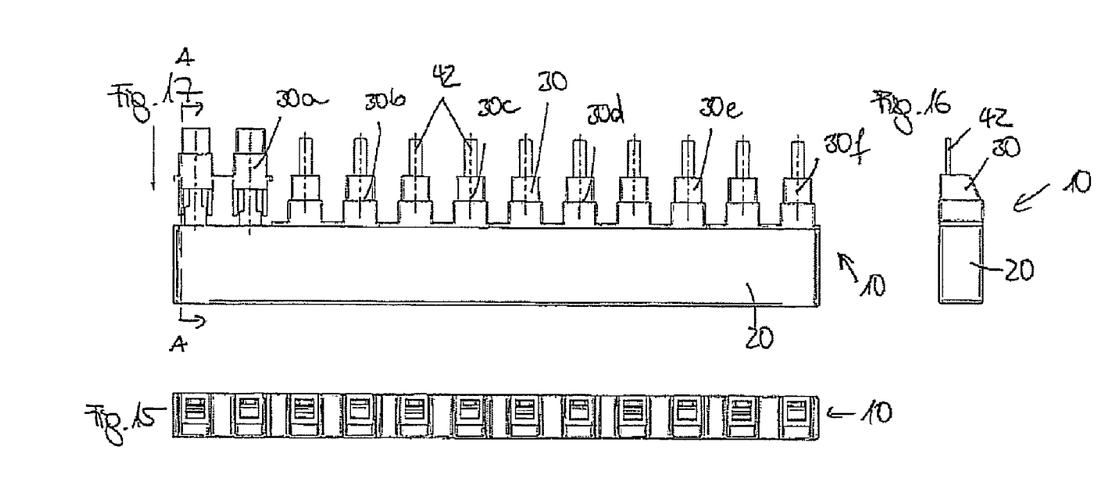
FIG. 15 shows a top view of the bus bar according to FIG. 14.
FIG. 16 shows a side view of the bus bar according to FIG. 14.
FIG. 17 shows the bus bar according to FIG. 14 with the cover section taken off.
Figure 18:
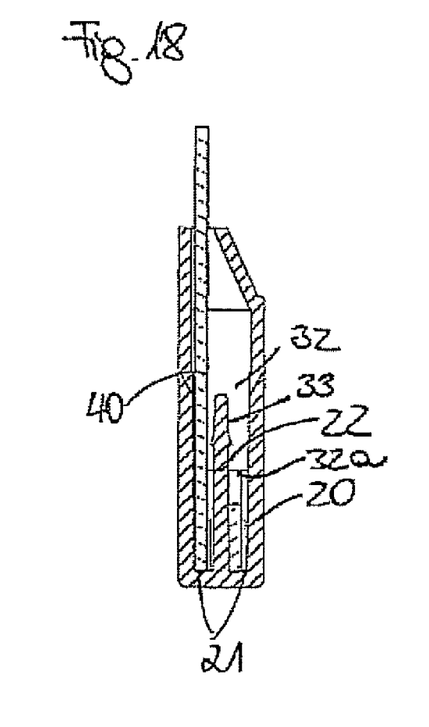
FIG. 18 shows a cross section along the line A-A in FIG. 17.

In FIGS. 14-18, a third embodiment example is represented, where identical or functionally identical parts with respect to the first embodiment examples are marked with identical reference numerals, and not all the reference numerals are represented in all the figures, for a clearer view.

The third embodiment example differs from the first embodiment example only in that only two pole connectors are provided, instead of three pole connectors 40. Accordingly, the bottom part 20 has only two chambers 21, and accordingly one chamber partition wall 22. Only one slot 33 is arranged in the partition walls 32. To simplify the association of the connecting lugs 42 that extend through the openings 31 of the cover part 30 with the corresponding pole connectors 40, the cover part 30 can be assembled from the cover sections 30*a*, 30*b*, 30*c*, 30*d*, 30*e*, 30*f* which present only two openings 31 instead of, as in the first embodiment example, three openings 31. In this third embodiment example it is naturally also possible to manufacture the bottom part 20 as a plastic injection molded part or by the extrusion method.

Figure 19:
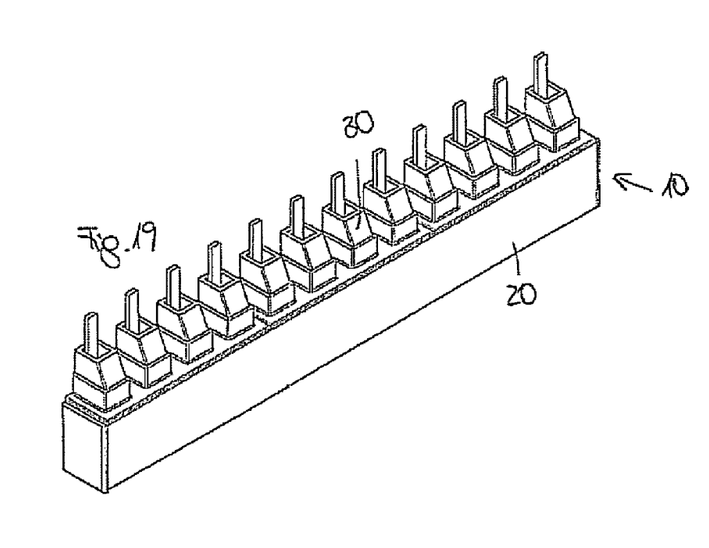
FIG. 19 shows a perspective view of a fourth exemplary additional embodiment of a bus bar in the assembled state.
Figures 20, 22:
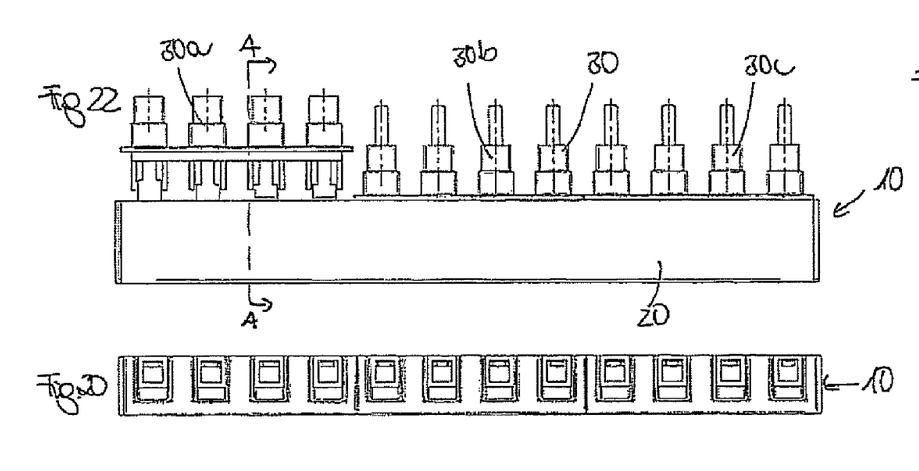
FIG. 20 shows a top view of the bus bar according to FIG. 19.
FIG. 22 shows the bus bar according to FIG. 19 with the cover section taken off.
Figure 21:
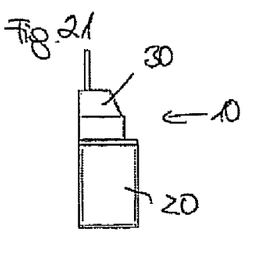
FIG. 21 shows a side view of the bus bar according to FIG. 19.
Figure 23:
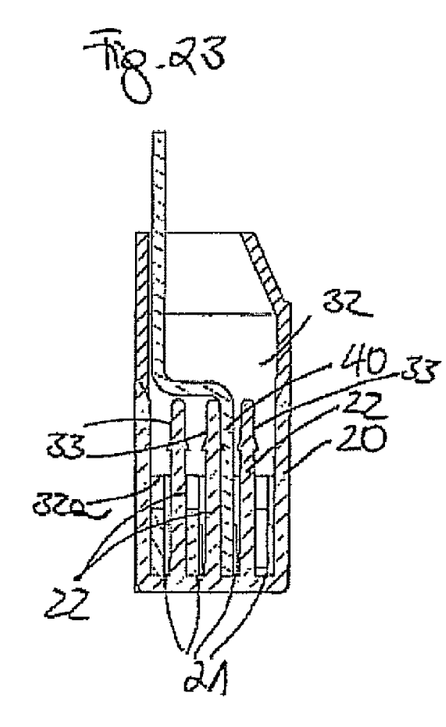
FIG. 23 shows a cross section along the line A-A in FIG. 22.

In FIGS. 19-23, a fourth embodiment example is represented, where identical or functionally identical parts with respect to the first embodiment examples are marked with identical reference numerals, and not all the reference numerals are represented in all the figures, to simplify the view.

The fourth embodiment example differs from the first embodiment example only in that four pole connectors are provided, instead of three pole connectors 40. Accordingly, the bottom part 20 has four chambers 21, and accordingly three chamber partition walls 22. Three slots 33 are arranged in the partition walls 32. To simplify the assignment of the connecting lugs 42 that extend through the openings 31 of cover part 30 to the corresponding pole connectors 40, the cover part 30 can be assembled from the cover sections 30*a*, 30*b*, 30*c*, which present four openings 31 instead of three openings 31 as in the first embodiment example. In this fourth embodiment example as well, it is naturally possible to manufacture the bottom part 20 as a plastic injected molded part or by the extrusion method.

Other embodiment examples are naturally conceivable, which present more than four chambers 21, and accordingly many chamber partition walls 22. Naturally, additional embodiment examples are also conceivable in which the number of the openings 31 of the cover parts 30 does not agree with the number of the pole connectors 40. In particular, it is then also possible to use cover parts 30 with only one opening 31.

In the claims, means or step-plus-function clauses are intended to cover the structures described or suggested herein as performing the recited function and not only structural equivalents but also equivalent structures. Thus, for example, although a nail, a screw, and a bolt may not be structural equivalents in that a nail relies on friction between a wooden part and a cylindrical surface, a screw's helical surface positively engages the wooden part, and a bolt's head and nut compress opposite sides of a wooden part, in the environment of fastening wooden parts, a nail, a screw, and a bolt may be readily understood by those skilled in the art as equivalent structures.

Having described at least one of the preferred embodiments of the present invention with reference to the accompanying drawings, it is to be understood that the invention is not limited to those precise embodiments, and that various changes, modifications, and adaptations may be effected therein by one skilled in the art without departing from the scope or spirit of the invention as defined in the appended claims.

What is claimed is:

1. A bus bar comprising:
    (a) a cover part made of an insulating material; and
    (b) a bottom part comprising two chambers each for the reception of one pole connector; and
        (i) wherein between said two chambers a chamber partition wall is arranged, wherein at least one connecting lug is arranged on a corresponding one of each of said pole connectors, and wherein said cover part can be set on said bottom part in such a way that each of said pole connectors is covered, and each of said at least one connecting lugs extends out, through corresponding openings in said cover part
        (ii) wherein, on said cover part, at least one partition wall is arranged, which is positioned between two adjacent connecting lugs, when said cover part is set on said bottom part; and
        (iii) wherein said at least one partition wall has a length, such that a lower edge of said at least one partition wall which is turned away from said cover part, is at a separation from the edge of said pole connector which faces said cover part when said cover part is set on said bottom part.

2. The bus bar according to claim 1, wherein, in the at least one partition wall, starting from a lower edge, a slot is arranged, in which said at least one chamber partition wall engages, when said cover part is set on said bottom part.

3. The bus bar according to claim 1, wherein said at least one partition wall has one or more slots that correspond to said one or more chamber partition walls.

4. The bus bar according to claim 1, wherein said cover part engages with said bottom part.

5. The bus bar according to claim 1, wherein said at least one partition wall engages on a corresponding chamber partition wall, when said cover part is set on said bottom part.

6. The bus bar according to claim 2, wherein said at least one chamber partition wall has a locking protuberance, said locking protuberance engaging in a corresponding recess in said slot of said at least one partition wall, when said cover part is set on said bottom part.

7. The bus bar according to claim 2, wherein said at least one chamber partition wall has a corresponding locking protuberance on each of its facing side surfaces, said corresponding protuberance engaging in a corresponding recess in said slot of said at least one partition wall when said cover part is set on said bottom part.

8. The bus bar according to claim 1, wherein said cover part has a plurality of partition walls wherein each one of said plurality of partition walls is arranged between each one of a set of two connecting lugs.

9. The bus bar according to claim 1, wherein said cover part comprises at least two cover sections.

10. The bus bar according to claim 9, wherein each of said at least two cover sections is designed so that they overlap in a longitudinal direction, at least in sections.

11. The bus bar according to claim 1, wherein said bottom part is designed as an extrusion profile.

12. The bus bar according to claim 1, wherein said bottom part is designed as an injection molded element.

13. The bus bar according to claim 1, wherein said bottom part is closable on its front side by a set of one or more end caps.

* * * * *